(12) United States Patent
Kristensen

(10) Patent No.: US 9,703,278 B2
(45) Date of Patent: Jul. 11, 2017

(54) ELECTRICAL ACTUATOR SYSTEM FOR ADJUSTABLE FURNITURE WITH CONTROL BOX HAVING PORTS IN OPPOSING WALLS

(71) Applicant: Henning Kristensen, Sydals (DK)

(72) Inventor: Henning Kristensen, Sydals (DK)

(73) Assignee: Linak A/S, Nordborg (DK)

( * ) Notice: Subject to any disclaimer, the term of this patent is extended or adjusted under 35 U.S.C. 154(b) by 244 days.

(21) Appl. No.: 14/275,398

(22) Filed: May 12, 2014

(65) Prior Publication Data
US 2014/0336822 A1    Nov. 13, 2014

(30) Foreign Application Priority Data
May 10, 2013    (DK) .................................. 2013 00273

(51) Int. Cl.
| G05B 15/02 | (2006.01) |
| A47B 9/00 | (2006.01) |
| A47B 9/04 | (2006.01) |
| F21V 33/00 | (2006.01) |
| H01H 13/72 | (2006.01) |

(52) U.S. Cl.
CPC ............... *G05B 15/02* (2013.01); *A47B 9/00* (2013.01); *A47B 9/04* (2013.01)

(58) Field of Classification Search
CPC .......... G05B 15/02; G05B 15/14; A47B 9/00; A47B 9/04
USPC .......... 385/78–88; 700/275; 5/613; 362/130; 312/312
See application file for complete search history.

(56) References Cited

U.S. PATENT DOCUMENTS

| 5,161,868 | A  | * | 11/1992 | Hooser  | A47B 19/06 312/223.4 |
| 6,360,675 | B1 | * | 3/2002  | Jones   | A47B 21/06 108/50.02 |
| 7,874,695 | B2 | * | 1/2011  | Jensen  | A61G 7/018 362/129 |
| 8,058,572 | B2 | * | 11/2011 | Bastholm | H01H 9/182 200/5 A |
| 8,581,436 | B2 | * | 11/2013 | Kristensen | A47C 20/041 307/1 |
| 8,955,178 | B2 | * | 2/2015  | Robertson | A47C 20/041 5/613 |
| 2007/0297150 | A1 | * | 12/2007 | Jensen | H05K 5/0021 361/736 |

(Continued)

FOREIGN PATENT DOCUMENTS

| EP | 0498111 | 8/1992 |
| EP | 2160958 | 3/2010 |
| EP | 2452589 | 5/2012 |

*Primary Examiner* — Akm Enayet Ullah
(74) *Attorney, Agent, or Firm* — Dykema Gossett PLLC

(57) ABSTRACT

An electrical actuator system for adjustable furniture, in particular height-adjustable tables (1), comprising at least one linear actuator (4), at least one operating unit (22) and a control box (12). By arranging therein at least one connector for cables into mutually opposing wall sections of the control-box cabinet for connection of linear actuators with cables, great simplification of the connection of the linear actuators to the control box is achieved, as when an uncoupling has been omitted, when the actuators have been wrongly connected during assembly, or if an actuator falls apart.

11 Claims, 2 Drawing Sheets

(56) References Cited

U.S. PATENT DOCUMENTS

2010/0132117 A1\* 6/2010 Westermann ........ A47C 20/041
5/600
2013/0088131 A1\* 4/2013 Messing ................ A47B 51/00
312/247

\* cited by examiner

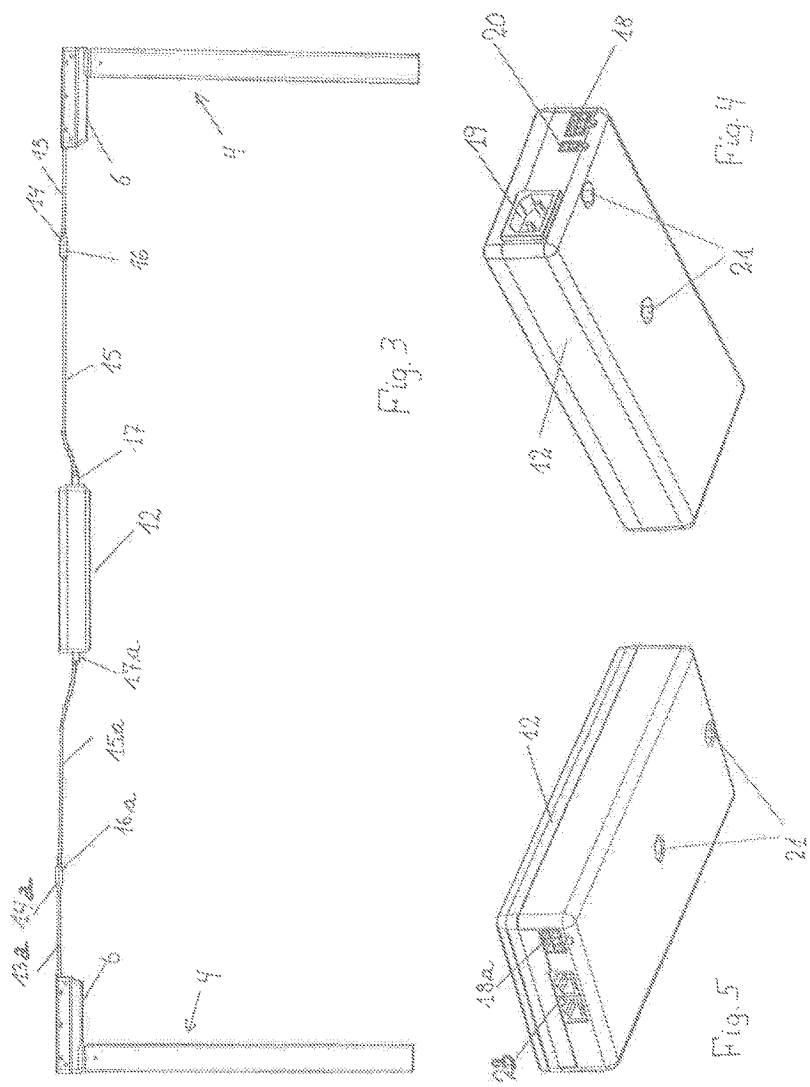

ELECTRICAL ACTUATOR SYSTEM FOR ADJUSTABLE FURNITURE WITH CONTROL BOX HAVING PORTS IN OPPOSING WALLS

BACKGROUND OF THE INVENTION

Field of the Invention

The present invention relates to an electrical actuator system for adjustable furniture, preferably height-adjustable tables. The invention also relates to a control box and an adjustable piece of furniture.

The Prior Art

The explaining of the invention takes as its point of departure height-adjustable tables having a tabletop mounted on a subframe. The subframe comprises a supporting frame for the tabletop and linear actuators designed as lifting columns having the appearance of a table leg which, at the lower end, is provided with a foot. The supporting frame is mounted at the upper end of the linear actuators. More specifically, reference is made to the type of table shown in FIG. 3 in EP 2 160 958 to Linak A/S. The linear actuators comprise a rectangular, box-shaped motor housing on an upper end of telescopically arranged profiles. The motor housing serves as a mounting plate for the linear actuators, in that there are mounting holes for screws in the two parallel side walls and in one end wall. The supporting frame comprises two parallel longitudinal members and one transverse member towards the end thereof. The distance between the longitudinal members is matched to the width of the motor housing in such a way that the motor housing fits between the longitudinal members. The linear actuators are secured with screws between holes in the longitudinal members intended for this purpose, just as the motor housing can, with one end, be secured to the transverse member with screws. The height of the longitudinal and transverse members are matched to the height of the motor housing on the linear actuators, so that the motor housing sits concealed and protected between the side members.

For logistical and shipping purposes, the tables are presented unassembled, so that they take up as little room as possible and can be shipped as a flat package. The tables are typically first assembled on the premises of the end user, where the feet are mounted on the linear actuators, the supporting frame on the top thereof, and then the tabletop. Wiring for the linear actuators, control box and operating panel is mounted last and positioned wherever seems appropriate in the particular case. The control box thereby comes to take up an arbitrary position beneath the tabletop, and the cable guiding follows this. The cables are guided unprotected and in an arbitrary manner beneath the tabletop, and surplus lengths of cable are simply rolled up and more or less temporarily clipped up and suspended beneath the table top. Inappropriately, the cables are positioned loose in the cable tray. To keep the cable guiding under control and avoid unsightly cabling, a cable tray may be mounted under the table. Since the cable tray contributes to the table's appearance, it must be designed so that it blends in with the design of the table. However, in a market in which the price of tables is under pressure, this is an unacceptably expensive solution.

As to height-adjustable desks or work tables, it is desirable to position lifting columns, control box and operating unit in such a way that the user is provided with as much free space beneath the tabletop as possible. From a design point of view it is also desirable for particularly the motor housing and control box of the lifting columns to be virtually invisible. This similarly applies to the cabling between the control box and lifting columns and operating panel respectively. To satisfy this requirement, the idea was also conceived of mounting the control box and various cables within the dimensions given by the two longitudinal members of the supporting frame on which the tabletop is mounted. The distance between the two longitudinal members is, as already mentioned, given by the width of the motor housing. In order to be able to fit the control box it is therefore necessary to reduce the outer dimensions thereof. Since the power supply to the control box typically is based on a ring-core transformer, the need to reduce the dimensions of the control box presents a spatial challenge. The reason for this is that the dimensions of the ring-core transformer cannot be altered directly. Moreover, with a view to the operational stability and useful life of the control box, it is desirable to retain the ring-core transformer. This is because, in some situations, the actuators can draw in the region of 15 amperes, which a ring-core transformer is able to produce. While the dimensions of ring-core transformers have been successfully reduced slightly by optimisation of said transformers, the ring-core transformer must still be positioned abutting the inner surfaces of the control-box cabinet. Thereby the width of the control box can be reduced so that it can be fitted between the two longitudinal pieces with perfect accuracy.

To simplify the cable connection to the control box and minimize the risk of faulty connection, it is furthermore appropriate for the mains voltage connector of the control box to be kept separate from the low-voltage connector to the lifting columns, and the modular connector to the operating panel. It is therefore appropriate for the mains voltage connector and the low-voltages connectors to be placed on opposite ends of the control box. In respect of the given installation measurements, this positioning of the connectors of the control-box results in the cable between at least one of the lifting columns and the control box not being guidable within the aforementioned installation measurements. Although this cable can be guided outside the dimensions given by the longitudinal members, this is not an appropriate solution.

In EP 2 452 589 A1 to Linak A/S a solution is disclosed wherein two longitudinal cable guides in the form of grooves are formed on the rear side of the control box, by which means one has—within the dimensions given by the longitudinal members—the possibility of guiding cables from the end of the control box, in the cable guides beneath said control box and to the linear actuator at the opposite side of the table. By this means, the user achieves the desired free space under the table and the height-adjustable table further has the desired design-consistent appearance. However, the cables must have been located in the cable guides before the control box could be mounted on the underside of the tabletop.

The invention relates to the problem of an adjustable table, in that a linear actuator may be connected to the control box without exceeding the installation measurements given by the longitudinal members beneath the tabletop of the height-adjustable table.

The purpose of the invention is to provide a control box which enables this and which does not alter the other dimensions of the control box, so that the control box may be mounted within the built-in dimensions provided by the longitudinal members.

SUMMARY OF THE INVENTION

This is achieved according to the invention wherein at least one connector for motor cables is arranged in each of two mutually opposing wall sections of the control-box cabinet for connection of linear actuators by means of motor cables. By this means a significant simplification of the connection of the linear actuators to the control box is achieved. Likewise, a disconnection is readily possible should the actuators have been wrongly connected during assembly, or if an actuator breaks down. This is in contrast to the control box wherein the cables are run in cable guides on the rear side of the control box, wherein the control box has to be disassembled in order to free the cables. As to control boxes without cable guides, it is also difficult to connect and disconnect the linear actuators since one is forced to secure the cables in connection with control boxes in some other way, for example across the box. In an embodiment according to the invention, the linear actuators can be freely connected and disconnected without appreciable difficulty. Furthermore, the invention also leads to a simplification of the cabinet of the control-box as compared with a control box designed with cable guides. Connection and disconnection of the linear actuators becomes especially easy if the motor cables are equipped with a connector at each end. The linear actuators and control box can thus be mounted in advance, after which the cables may be drawn through and mounted.

The invention also relates to a control box for an electrical actuator system in which the control box comprises a cabinet, a mains voltage connector for supplying the control box with a mains voltage, one or more connectors, preferably low-voltage connectors, for connection of one or more linear actuators and one or more connectors, preferably modular connectors, for connection of one or more operating units, wherein there is arranged therein at least one port in two mutually-opposing wall sections of the cabinet of the control box for the connection of linear actuators.

In realizing the invention it will be understood that the invention is not limited to control boxes wherein the power supply is based on a ring-core transformer. The invention can also be used in connection with a switch mode power supply, wherein there also may be a requirement for a secure guiding of cables from one end of the control box to the other.

The invention further relates to an electrically-adjustable piece of furniture, preferably a height-adjustable table, equipped with an actuator system. In realizing the invention it is also understood that that the invention is not limited to use in connection with height-adjustable tables. The invention can also be used in connection with adjustable beds and chairs. In one embodiment of the adjustable piece of furniture, it comprises a member having a planar surface on which the control box may be mounted. An example of a hospital bed having a flat, planar and fixed central part on which the control box may be mounted is shown in FIG. 1 of EP 0 498 111 A2 to J. Nesbit Evans Co. Ltd. In a hospital bed the actuator system is for adjusting the backrest and legrest section of the support frame for the mattress and eventual for height adjustment of the bed. In one embodiment, the electrically adjustable piece of furniture is a height-adjustable table having a tabletop, wherein the member having the planar surface consists of the undersurface of the tabletop.

BRIEF DESCRIPTION OF THE DRAWINGS

Other features of the invention will be apparent in conjunction with the following description of an embodiment of the electrical actuator system according to the invention with reference to associated drawings, wherein:

FIG. 3 shows the two linear actuators connected to the control box in the height-adjustable table shown in FIG. 1, FIG. 4 shows a first perspective end view of the control box of the height-adjustable table in FIG. 1, and FIG. 5 shows an opposite perspective end view of the control box.

DETAILED DESCRIPTION OF THE EMBODIMENTS

Figure 1:
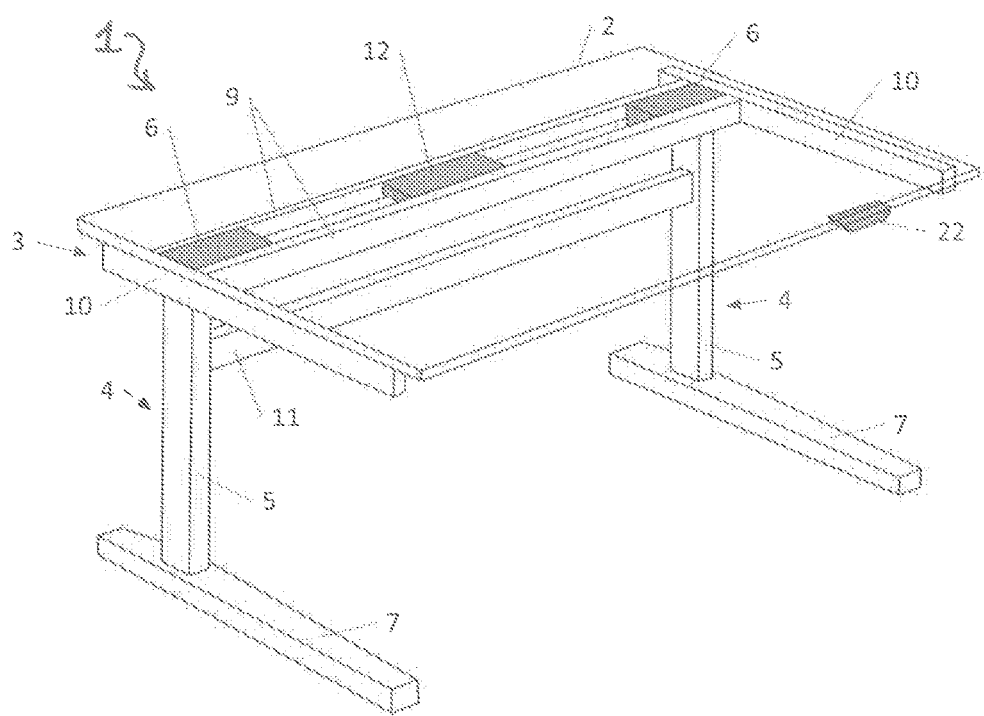
FIG. 1 is a perspective view of a height-adjustable table wherein the tabletop is shown as transparent.

FIG. 1 shows a perspective view of a height-adjustable table 1 comprising a tabletop 2. At both ends of the tabletop 2 a linear actuator is mounted in the form of a lifting column 4, for example of the type mentioned in WO2004/100632 A1 to Linak A/S, mounted in a supporting frame 3 upon which the tabletop 2 is mounted. A foot 7 is mounted at the lower end of each of the lifting columns 4. The lifting columns 4 comprise a motor housing 6 and two mutually telescopically-arranged profiles. One profile 5 is rigidly fixed to the foot 7 and the other profile may be displaced telescopically out of and into the stationary profile 5. The displaceable profile is moved by an electric motor which drives a spindle via a gear (not depicted). On the spindle there is positioned a spindle nut secured against rotation which is fastened to the telescopically movable profile. Displacement of the tabletop 2 is thus determined by the movable profile.

The supporting frame 3 on which the tabletop 2 is mounted comprises two parallel longitudinal members 9 and two parallel transverse members 10. The two lifting columns 4 are here mutually connected to a cross beam 11 in order to increase the stability of the height-adjustable table 1. The motor housing 6 and control box 12 of the lifting columns are mounted within the dimensions, that is to say the length, width and height, provided by these longitudinal members 9 and transverse members 10. In order to preserve these dimensions, the distance between the two longitudinal members 9 serves in such a way that the free passage between the control box 12 and the two longitudinal members 9 accurately enables mounting of the control box 12.

Figure 2:
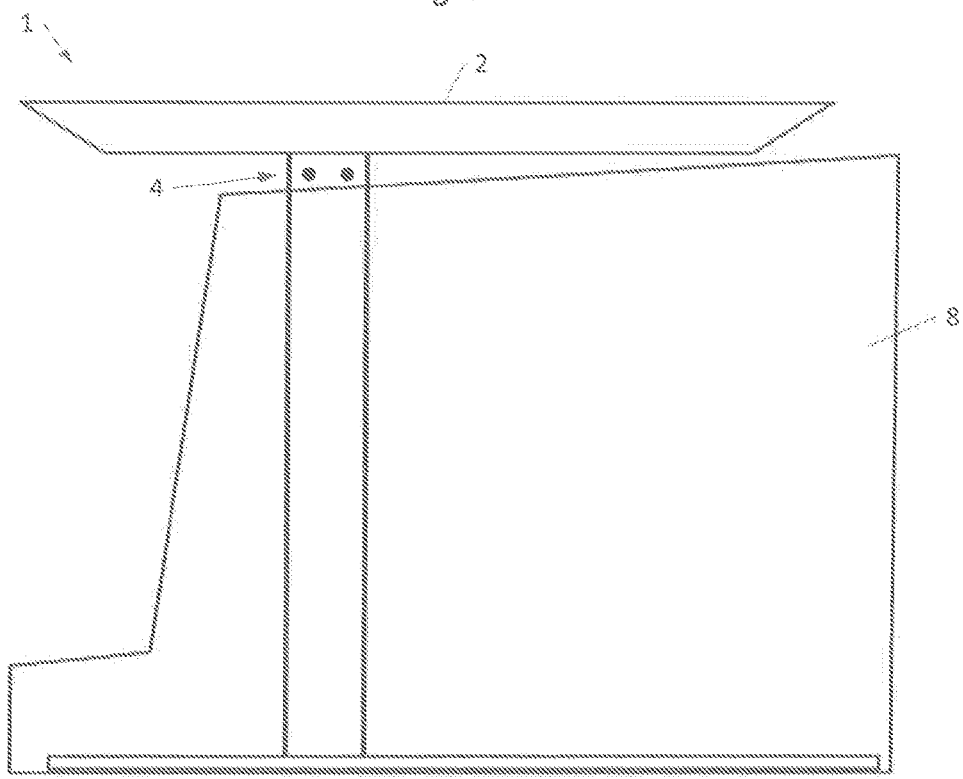
FIG. 2 is a side view illustration of a height-adjustable table.

FIG. 2 illustrates the free space 8 which the user of a height-adjustable table 1 must have beneath the tabletop 2 when the tabletop is in its lowest position in accordance with standards and guidelines from the Danish Working Environment Authority.

FIG. 3 shows the two linear actuators 4, which include a cable 13, 13a extending from the end of the motor housing 6. The free end of the cable is provided with a connector 14, 14a. The actuator 4 shown on the right in the figures is connected to the control box 12 with a cable 15 which is provided at each end with a connector 16, 17, in that the one connector 16 is connected to the connector 14 on the cable from the linear actuator, while the other connector 17 is connected to a port 18 at one end of the control box (see FIG. 4). Likewise, the actuator 4 shown on the left in the figures is connected via a corresponding cable 15a with connectors 16a, 17a to a port 18a an opposite end of the control box 12 (see FIG. 5). The connectors 14,17;14a,17a and the ports 18,18a may, for example, be of the Molex Mini-fit type, or of the Mini DIN, Power DIN or jack type. The modular connectors may also be of the type and/or be known by the names modular bushing, Bell connector, Bell bushing, modular crimp connector, and modular crimp bushing. As an alternative to the linear actuators being provided with a cable 13, 13a they may be equipped with a port for direct connection of the cables 15, 15a to the control box 12. At the end of the control box 12 shown on the right in FIG. 4, in addition to the port 18 for the cable to the actuator, there is a port 19 for a mains connector (not shown) and a port 20 for connection of an operating unit 22 (see FIG. 1) to the control box. With only one port 19 for a mains connector and one port 20 for an operating unit 22, as well as one port for a linear actuator, there is sufficient space and opportunity to have the necessary galvanic separation between the different ports. Port 19 for the mains connector is usually 240V/120V, whereas the other two ports are low-voltage ports. It is noted however, that port 18 to the actuator may also be a port far a mains voltage. In the left end of the control box 2 are more ports 23 for connecting of further equipment, e.g., a PC, so that the table can be controlled from this. For fixing of the control box 12 on the underside of the tabletop 2, it has two through-going screw channels 21. It will be understood however, that the control box 12 may be fixed in another way, e.g., with a plate fixed to two parallel transverse members 10.

Here is described a control box 12 with a rectangular, box-shaped cabinet, but the invention can of course also be used for another geometric design of the cabinet, for example with an octagonal or circular cross section.

As to an adjustable piece of furniture, it is understood a piece of furniture with one or more elements which can be adjusted in connection to another part of the piece of furniture by means of the electric actuator system, e.g., the above mentioned comment regarding hospital beds; however, it also includes pieces of furniture in which the actuators of the electrical actuator system itselves makes up the adjustable elements c.f. the comments concerning a table. It is to be understood that actuators constructed as dedicated lifting columns can be used for height adjustment of both tables and beds.

The invention claimed is:

1. An electrical actuator system for adjustable furniture, comprising at least one linear actuator, at least one operating unit, a control box comprising a case-like cabinet having two mutually-opposing end walls, and wherein the control box contains a power supply and a controller for the at least one linear actuator, and wherein one end wall of the control box includes a mains voltage port for a mains voltage cable and at least two ports for connection of the at least one linear actuator, and for connection of the at least one operating unit, and wherein the electrical actuator system comprises one or more motor cables for connecting one or more linear actuators with one or more ports, and one or more control cables for connecting one or more operating units with one or more ports, and including at least one port for a cable in each of two mutually-opposing wall sections of the cabinet of the control box for connecting linear actuators.

2. The electrical actuator system according to claim 1, wherein each of the cables includes a connector at each end.

3. The electrical actuator system according to claim 1, wherein each actuator includes a cable which extends from an end of the motor housing, a free end of each cable including a connector.

4. The electrical actuator system according to claim 1, wherein a motor housing of an actuator includes a port for a cable.

5. A control box for an electrical actuator system comprising a cabinet, a mains voltage port for supplying the control box with a mains voltage, one or more connectors for connection of one or more linear actuators and one or more ports, for connection of one or more operating units, and including at least one port in each of two mutually-opposing wall sections of the cabinet of the control box for the connection of linear actuators.

6. Electrically-adjustable furniture comprising an electrical actuator system according to claim 1.

7. The electrically adjustable furniture according to claim 6, wherein the electrically adjustable furniture comprises a height-adjustable table.

8. A control box for an electrical actuator system comprising:
a cabinet which includes first and second opposing walls,
a first exterior port located in one of said first and second walls for connection of a cable supplying a mains voltage,
a second port located in one of said first and second walls for connection of a cable from an operating unit, and
a third port located in said first wall and a fourth port located in said second wall for connection of respective cables from first and second linear actuators.

9. An electrical actuator system for adjustable furniture, said electrical actuator system comprising:
a first linear actuator,
a first operating unit,
a control box which includes a cabinet containing a power supply and a controller for said first linear actuator, said cabinet having opposing first and second end walls, a first exterior port located in one of said first and second end walls for connection of a mains voltage, a second exterior port located in one of said first and second end walls for connection of said first operating unit, and a third exterior port located in said first end wall for connection of said first linear actuator,
a first cable connecting said first linear actuator with said third exterior port, and
a second cable connecting said first operating unit with said second exterior port.

10. The electrical actuator system according to claim 9, wherein said cabinet of said control box includes a fourth exterior port in said second end wall.

11. The electrical actuator system according to claim 10, including a second linear actuator and a third cable for connecting said second linear actuator with said fourth exterior port.

* * * * *